June 24, 1969  F. R. WATSON  3,451,652
SANITARY VALVE
Filed Nov. 29, 1966
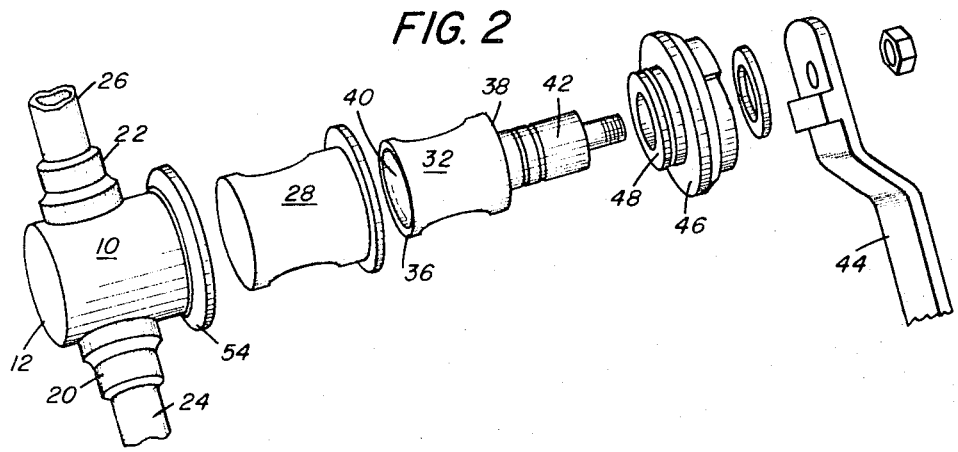
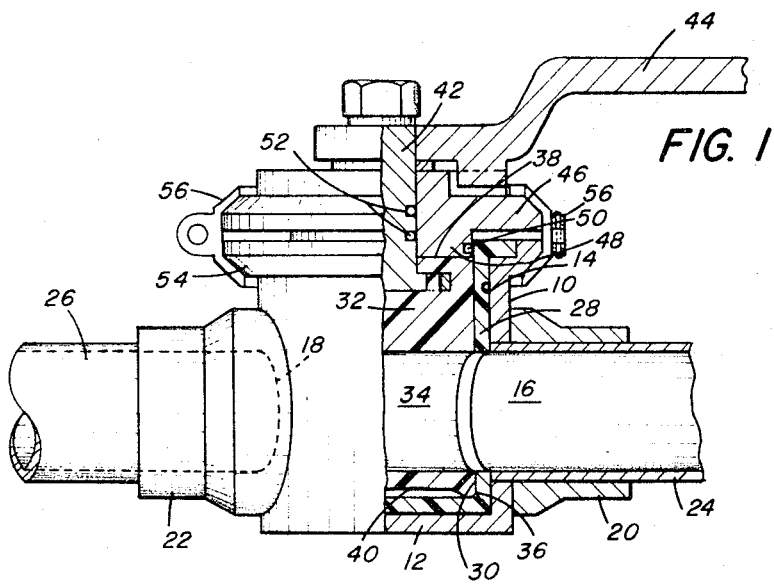
FREDERICK R. WATSON
INVENTOR.
BY
ATTORNEYS

United States Patent Office 3,451,652
Patented June 24, 1969

3,451,652
SANITARY VALVE
Frederick R. Watson, Rochester, N.Y., assignor to Eastman Kodak Company, Rochester, N.Y., a corporation of New Jersey
Filed Nov. 29, 1966, Ser. No. 597,688
Int. Cl. F16k 5/04, 27/06
U.S. Cl. 251—192   9 Claims

ABSTRACT OF THE DISCLOSURE

The present invention is directed to a valve construction and more particularly to an improved sanitary stop-cock valve having a rigid "Teflon" liner and a deformable, cylindrical "Teflon" plug which may be easily cleaned and which is of relatively inexpensive construction.

---

In the preparation of various items such as foodstuffs, pharmaceuticals, chemicals, and other similar materials, it is desirable, if not necessary, that the system be constructed so that it may be readily cleaned to reduce and, if possible, eliminate the possibility of contamination of a material by the remnant of any other material previously contained in the system. Thus, such systems should be made of materials that do not retain the fluids passing therethrough and should have substantially impervious, crevice-free inner surfaces that can be readily and completely cleaned. If such cleaning is not possible, then product contamination may occur, either reducing the value of the subsequent product or completely ruining it. For example, should a residue of one drug remain in the system when it is subsequently used to manufacture a completely different drug, the resulting compound may be unusable or even dangerous.

One of the most difficult portions of such systems to clean are the valves used therein. Many attempts have previously been made to construct a valve which may be readily and completely cleaned for use in such sanitary systems. However, the usefulness of prior valves has been limited either by the difficulty with which they may be cleaned, by the fact that hidden areas or crevices may make complete cleaning difficult or impossible, or by the fact that the valves are generally expensive. Examples of such valves of the prior art may be found in U.S. Patents 2,905,197, 3,041,036, 3,103,948 and 3,133,722. These references are directed to plug-type valves intended for use in systems where either corrosion is a problem or where cleanliness is essential. Nearly all of these valves utilize surfaces composed of a synthetic resin such as a polyester, polyvinyl chloride, and especially polytetrafluoroethylene, generally referred to by the trade name "Teflon."

However, each of these prior art valves is limited, for one or more reasons, in its application to systems requiring extreme cleanliness. Generally, these valves are so complex that they are very expensive. Furthermore, they incorporate configurations having recesses, crevices, or sharp corners which make them extremely difficult to clean. In addition, many such valves of the prior art are constructed with frustoconical plugs which provide a seal not generally possible in cylindrical plug valves. However, the force generally necessary to operate valves having frustoconical plugs is so great that wear rates are high and service life short.

Accordingly, the present invention provides a plug valve having a cylindrical plug which is of simple construction and is thus inexpensive to make, the cost being about one-third that of comparable prior art sanitary valves. At the same time, the interior surfaces of the present valve are substantially impervious and crevice-free and are made of a material characterized by high antifrictional and corrosion resistant properties. Moreover, the valve of the present invention is constructed with a cylindrical plug disposed in a cylindrical valve body so that the operating force required is minimized and service life is increased. At the same time, the present valve is arranged so that, even though of cylindrical construction, no leakage is encountered.

The present invention thus comprises a plug valve consisting of a substantially cylindrical valve body having a substantially cylindrical bore therein. The bore is arranged with a closed end and an open end. At least two flow passages are formed through the body and intersect the bore. The bore is provided with a substantially rigid, impermeable, and crevice-free cup-shaped liner formed of a material characterized by high antifrictional and corrosion resistant properties. The liner is provided with a substantially cylindrical chamber communicating with the flow passages in the valve body and has a closed end corresponding to the closed end of the valve body bore. A substantially cylindrical, impermeable, crevice-free deformable plug member is removably disposed within the cylindrical chamber and has an opening therethrough arranged for alignment with the flow passages. The plug member is also formed of material characterized by high antifrictional and corrosion resistant properties. A force producing member is arranged to apply an axial force to the plug member to cause it to deform adjacent the openings of the flow passages into the chamber so as to form a seal about the openings between the plug and the liner.

In addition, the present invention provides a plug valve wherein both the liner and the plug member are formed of a plastic material comprising the halogen substitution products of polyethylene characterized by high antifrictional and corrosion resistant properties, and more particularly known by the trade name, "Teflon." More specifically, the valve of the present invention is provided with substantially smooth, impervious and crevice-free internal surfaces which permits complete cleaning of the interior of the valve with relative ease.

Furthermore, the lower end of the plug member of the present valve is arranged to abut the closed end of the liner in the valve body. Upon the imposition of an axial force to the plug member, it is deformed about the flow passage openings to form fluid-tight seals thereabout between the plug and the liner.

More specifically, the abutting end, or bottom, of the plug member is provided with a recessed central portion which minimizes the turning force required to operate the valve.

The various features of novelty which characterize the invention are pointed out with particularity in the claims annexed to and forming a part of this specification. For a better understanding of the invention, its operating advantages and the objectives obtained by its use, reference should be had to the accompanying drawings and descriptive matter in which a preferred embodiment of the invention has been illustrated.

Of the drawings:

FIG. 1 is an illustrative, partly in vertical section, of a specific embodiment of the present invention; and FIG. 2 is an exploded view of the specific valve embodiment illustrated in FIG. 1.

The valve of the present invention comprises a generally cylindrical body 10 having a closed end 12, and an oppositely disposed open end. The valve body is provided with a substantially cylindrical bore 14. At least two flow passages 16 and 18 are formed through the cylindrical wall of the body and intersect the bore in a manner well known in the art. Each flow passage may be provided with a fitting 20 and 22 adapted for connection to pipes 24 and 26, also in a manner well known in the art. A substantially rigid, impermeable, and crevice-free, cup-shaped liner 28 is disposed within the bore 14 of the valve. The liner is provided with a substantially cylindrical chamber 30, generally coaxial with the bore 14 of the valve body, and is provided with openings therethrough corresponding to the flow passages 16 and 18 in the valve body. The liner 28 is also provided with a closed end and an open end corresponding, respectively, with the closed end and the open end of the valve body. The liner is made of a plastic material having a low coefficient of friction and good corrosion and abrasion resistant properties. The plastic may be a polyester, polyvinyl chloride, polytetrafluoroethylene, and the like, and more particularly the plastic known by the trade name "Teflon." Preferably, the liner is reinforced and given rigidity by the inclusion of glass or metal fibers molded integrally therewith.

A substantially cylindrical, impermeable, crevice-free, deformable plug member 32 is removably disposed within the cylindrical chamber of liner 28 and closely conforms to the inner surface thereof. The plug member is provided with an opening 34 therethrough arranged for alignment with the flow passages in the valve body. One end 36 of the plug member abuts the closed end of liner 28 and the other end 38 terminates short of the open end of the valve body and liner. The abutting, or lower, end of the plug member may be provided with a recessed portion 40 whose function will be more thoroughly defined hereinbelow. The plug member is also formed of a material characterized by high antifrictional and corrosion resistant properties and, more particularly, of a plastic material comprising the halogen substitution products of polyethylene, especially the material known by the trade name, "Teflon." Integrally attached to the plug member and extending coaxially from the upper end thereof is an operating stem member 42 which is boltably connected to an operating lever 44. The stem member 42 extends upwardly through a valve closure member 46 which is arranged to sealingly close the upper end of chamber 30 of the liner 28. The closure member 46 may be provided with a smaller diameter portion 48 arranged to sealingly engage the upper extremity of chamber 30. In order to form a more complete seal, an O-ring 50 may be provided at that point. Similarly, a pair of O-rings 52 may be provided for stem member 42 where it passes through closure member 46. In the valve illustrated, the upper end of the valve body is provided with a flange member 54 which is arranged to cooperate with the closure member 46. A closure clamp 56, of a type well known in the art is arranged to engage both the closure member 46 and flange 54 to supply the sealing force required. While a closure clamp is illustrated and may be desirable where frequent access to the interior of the valve is necessary, it will be appreciated that this is only by way of illustration and any other standard coupling method may be used.

The closure member 46 is also arranged to apply an axial force to the upper end of the valve plug member 32 forcing it against the lower end of liner 28. Inasmuch as the "Teflon" forming the plug member is not reinforced, the axial force operates to deform the plug member. Since the strength of the plug member is reduced at the location of the opening 34 therethrough, the outer surface of the plug member tends to bulge outwardly at that area thus forming a seal about the flow passage openings 16 and 18 between the plug member and the liner. The recessed portion 40 at the lower end of the plug member reduces the amount of surface contact between the plug member and the liner at that location so as to minimize the friction generated and the operating force necessary to turn the plug member.

While the simplest manner of applying the axial force to the plug member 32 is by means of the closure member 46, it will be appreciated that other arrangements may readily be adapted to cause the plug member to deform and thus effect the seal about the flow passage openings.

While it is preferred that the reinforced liner 28 be integrally cast in the valve body, resulting in a unitary construction, the valve body and the liner can be separately formed and later joined, care only being necessary that a crevice-free, leak-tight joint be formed between the body and the liner at the flow passage openings.

It will be noted that the present valve is constructed using substantially all cylindrical surfaces which facilitates the fabrication thereof, especially compared with prior art valves utilizing spherical members and surfaces, since only simple machining operations need be performed on the present valve. Thus, the cost of the present sanitary valve may be as little as one-third that of prior art sanitary valves. Moreover, the use of substantially cylindrical surfaces permits complete and relatively easy cleaning thereof. Similarly, the lack of any sharp internal corners or crevices substantially eliminates the possibility that any material may remain after cleaning which would contaminate material subsequently passing through the valve.

Likewise, the use of a plastic material such as "Teflon" to form all of the internal surfaces of the present valve contributes to the ease and completeness of cleaning. This is true because of the chemical inertness of "Teflon," the fact that the "Teflon" surfaces are generally impermeable to the materials flowing therethrough, and the fact that other materials generally do not adhere to its surface. Likewise, the antifrictional characteristics of "Teflon" contribute to the ease of operation with the resultant reduction in wear and increased service life.

Similarly, the cylindrical configuration of the present valve both reduces the operating force necessary and at the same time increases the service life significantly over prior art frustoconical type plugs. At the same time, the use of a deformable plastic plug member permits achieving a leakproof seal not formerly associated with cylindrical valves.

I claim:

1. A plug valve comprising a valve body having a bore and at least two flow passages opening into said bore, a substantially rigid, impermeable, and crevice-free liner formed of material characterized by high antifrictional and corrosion resistant properties disposed in the bore of said valve body, said liner having a substantially cylindrical chamber communicating with said flow passages in said valve body, a substantially cylindrical, impermeable, crevice-free deformable plug member removably disposed in said chamber and having an opening therethrough arranged for alignment with said flow passages, said plug member formed of a material characterized by high antifrictional and corrosion resistant properties, and means for applying an axial force to said plug member to cause said plug member to deform adjacent the openings of said flow passages into said chamber to form a seal about said openings between the plug member and the liner.

2. A plug valve according to claim 1 wherein the lining and plug member are formed of a plastic material comprising the halogen substitution products of polyethylene.

3. A plug valve according to claim 1 wherein the plastic material forming said liner and said plug member is polytetrafluoroethylene.

4. A plug valve according to claim 1 wherein one end of said plug member is arranged to abut the end of said liner, said end of said plug member having a recessed central portion.

5. A plug valve according to claim 1 wherein said plug member closely conforms to the liner chamber.

6. A plug valve comprising a valve body having a bore and at least a pair of flow passages opening into said bore, said bore having a closed end and an open end, a substantially rigid, impermeable, and crevice-free, cup-shaped polytetrafluoroethylene liner disposed in the bore of said valve body, said liner having a substantially cylindrical chamber communicating with said flow passages in said valve body, said liner having a closed end corresponding to the closed end of said valve body bore, a substantially cylindrical, impermeable, crevice-free, and deformable polytetrafluoroethylene plug member removably disposed in said chamber and having an opening therethrough arranged for alignment with said flow passages, one end of said plug being arranged to abut the closed end of said liner, and a valve closure member arranged to sealingly close the open end of said bore and to apply an axial force to said plug member to force it against the closed end of said liner and to cause it to deform adjacent the openings of said flow passages into said chamber to form a seal about said openings between the plug member and the liner.

7. A plug valve according to claim 6 wherein said liner is reinforced by a fibrous material integral with said polytetrafluoroethylene.

8. A plug valve according to claim 7 wherein said fibrous material is glass fibers.

9. A plug valve according to claim 6 wherein said liner is integrally formed in the bore of said valve body.

References Cited

UNITED STATES PATENTS

| | | | |
|---|---|---|---|
| 2,766,961 | 10/1956 | Meusy | 251—317 X |
| 3,073,336 | 1/1963 | Johnson | 251—317 X |
| 3,192,943 | 7/1965 | Moen | 251—317 X |
| 3,346,233 | 10/1967 | Billson | 251—172 |

M. CARY NELSON, *Primary Examiner.*

MICHAEL O. STURM, *Assistant Examiner.*

U.S. Cl. X.R.

137—375; 251—317